Oct. 21, 1952     N. E. WAHLBERG     2,614,436

STEERING MECHANISM

Filed March 29, 1946

NILS ERIK WAHLBERG
*INVENTOR.*

BY Carl J. Barbee

HIS ATTORNEY

Patented Oct. 21, 1952

2,614,436

UNITED STATES PATENT OFFICE 2,614,436

STEERING MECHANISM

Nils Erik Wahlberg, Chicago, Ill., assignor to Nash-Kelvinator Corporation, Kenosha, Wis., a corporation of Maryland Application March 29, 1946, Serial No. 658,104

5 Claims. (Cl. 74—490)

This invention relates to vehicle steering mechanisms and more particularly to a bearing for a steering shaft of the type used in the steering mechanisms of automobiles.

It is an object of this invention to provide a bearing for the steering shaft of an automobile which extends between said shaft and the inner walls of the steering column and thus supports said shaft in said column.

It is another object of this invention to provide a bearing for a steering shaft of an automobile which is spring loaded to maintain the parts thereof in close engagement with each other so that no looseness will develop in said bearing due to excessive use thereof.

It is another object of this invention to provide a bearing for the steering shaft of an automobile which will reduce the vibrations transmitted through said shaft to the steering hand wheel.

It is another object of this invention to provide a bearing for the steering shaft of an automobile which will be noiseless throughout the length of its utility.

It is a further object of this invention to provide a bearing for a steering shaft of an automobile which is economical to manufacture, simple in design and easily applicable to the ordinary steering mechanism of an automobile without revision of any of the parts thereof.

Figure 1:
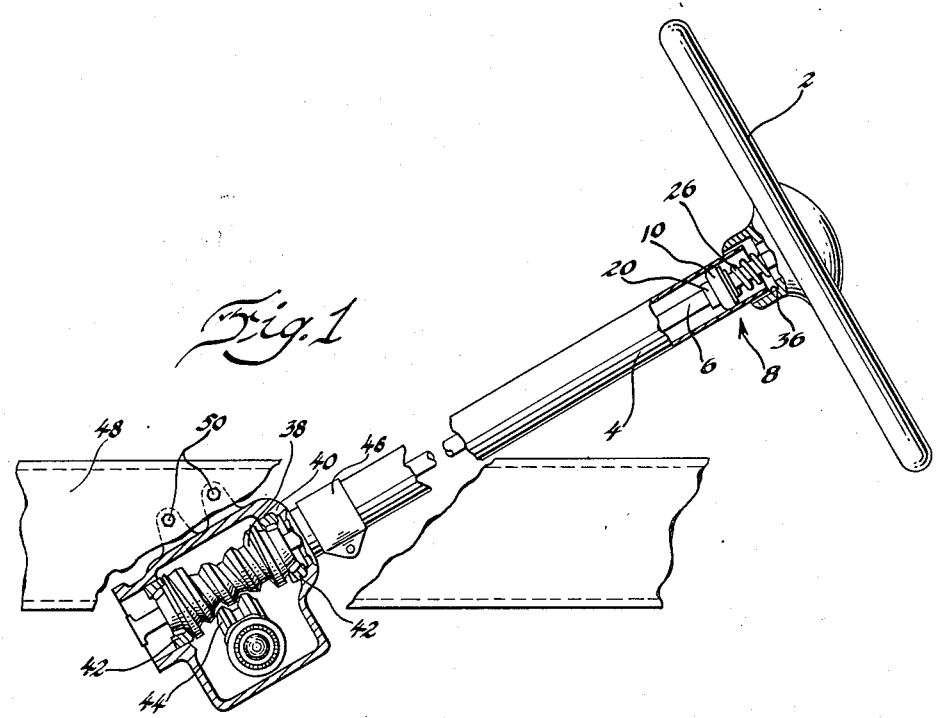
Figure 2:
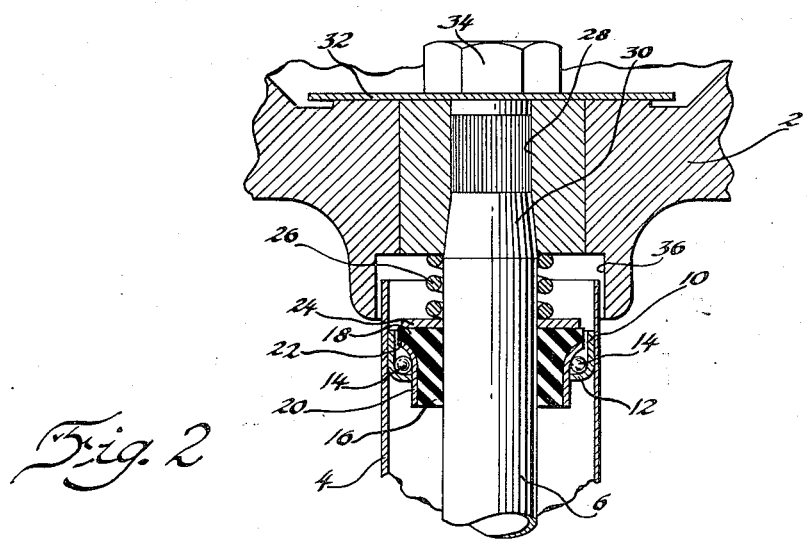

Other objects and advantages of this invention will be apparent from a consideration of the following description and claims and the attached drawing, of which there is one sheet, and in which:

Figure 1 is a side elevational view, partially broken away, of a portion of a vehicle steering mechanism; and Figure 2 is a sectional view of the invention as shown in Figure 1.

The transmitting of vibrations to the driver's hands created when driving on rough roads is a constant problem to the manufacturers of automobiles. These vibrations are transmitted from the wheels through the steering mechanism, chiefly, through the steering shaft on which the hand wheel is mounted. Ordinarily, the steering shaft is supported within a tubular steering column and is of such a length that it is necessary to support said shaft in the column near its upper end by the use of a bearing. Many types of bearings have been used but almost without exception such problems as noise, hard steering, failure to dampen vibrations, etc. have accompanied the use of these bearings. Applicant's invention provides a bearing which will make no noise, will not appreciably increase the energy necessary to perform the functions of steering and which will not form a node for the vibrations in the supporting bearing but will transfer said node to the driver's hands. As the node is the quiet point in any vibrating structure, the driver will not be conscious of the vibrations.

Referring in detail to the figures in which like numerals are used throughout to designate like parts, Figure 1 shows a portion of a vehicle steering mechanism comprised of a hand wheel 2, a steering column 4, a steering shaft 6 mounted within column 4, a worm 38 rigidly secured to the lower end of shaft 6 and rotatably secured within housing 40 by bearings 42, and a worm gear 44, rotatable by worm 38, which is connected to the steerable wheels. Housing 40 is rigidly secured to the bottom of column 4 as a portion of said housing extends within said column and clamp 46 squeezes the lower end of column 4 into frictional engagement with that portion of housing 40.

Housing 40 is rigidly secured to the side rail 48 of the vehicle frame by bolts 50 secured within aligned apertures in said housing and side rail. In this manner, a rigid support for column 4 is provided. It will be understood that additional support for a column such as column 4 is sometimes provided in the form of a bracket secured between said column and the dash panel of the vehicle; for simplicity, applicant has not shown such a bracket as the use of a column 4 of comparatively large diameter will provide a sufficiently rigid support for wheel 2 and shaft 6 without the use of a bracket of this type.

The invention is indicated generally at 8 in Figure 1 and comprises a sleeve 10 which is press fitted or rigidly secured by other means to the inner walls of column 4 and has an inwardly extending flange 12 around the bottom thereof. A series of ball bearings 14 are positioned against the upper side of flange 12.

A sleeve 16 of rubber or similar resilient material is positioned around the steering shaft 6 between said shaft and sleeve 10. Sleeve 16 is provided with an enlarged portion 18 near its top. A rigid sleeve 20 is positioned around the outer periphery of resilient sleeve 16 and bonded thereto. Sleeve 20 is provided with an outwardly extending flange 22 defining its top which abuts against the lower side of portion 18 of resilient sleeve 16. Flange 22 is positioned so as to rest on the balls 14.

Telescopically positioned around shaft 6 is a washer 24 which is constantly pressed downwardly against the sleeve 16 by compression spring 26 which extends upwardly from washer 24 to hand wheel 2. Hand wheel 2 is rigidly secured to the upper end of shaft 6 by being provided with an aperture 28 extending through its center in which is positioned the upper reduced and partially splined end 30 of shaft 6. Telescopically positioned around end 30 of shaft 6 is a washer 32 which is held against the upper side of hand wheel 2 by nut 34, which is turned on the threaded upper end (not shown) of shaft 6.

On its lower side, hand wheel 2 is provided with an aperture 36 slightly larger than the outside diameter of column 4, the upper end of which extends into said aperture to conceal the said end from view.

In this manner applicant has provided a bearing mounting for a vehicle steering shaft which utilizes a rubber sleeve between the shaft and the bearing. In this invention the node of vibrations transmitted through the shaft, which is rigidly mounted at its lower end, is moved from said bearing, due to the dampening effect of the sleeve, upwardly to the next point of contact which is the driver's hands. The node being thus positioned, the driver will not be conscious of the vibrations.

Further, applicant has provided a bearing of novel construction which will not become noisy after prolonged use and will not materially increase the effort necessary to rotate the steering shaft.

While applicant has described the invention in some detail, it is intended that this description is an example only and not in any way a limitation of the invention, to which applicant makes the following claims.

I claim:

1. In a vehicle steering mechanism, a steering column, a steering shaft extending through said column, a resilient sleeve telescopically positioned around said shaft, a bearing means telescopically positioned around said sleeve and extending to the inner walls of said column, a hand wheel rigidly secured on one end of said shaft, and means interposed between said hand wheel and said sleeve for constantly urging said sleeve in one direction along the axis of said shaft.

2. In a vehicle steering mechanism, a steering column, a steering shaft extending through said column, a resilient sleeve telescopically positioned around said shaft in frictional engagement therewith, a ball bearing means positioned between said sleeve and the inner walls of said column having the inner race thereof rigidly secured to said sleeve and the outer race thereof rigidly secured to said column, a hand wheel rigidly secured on one end of said shaft, and means interposed between said sleeve and said hand wheel for constantly urging said sleeve in a direction away from said wheel.

3. In a vehicle steering mechanism, a steering column, a shaft extending through said column, a resilient sleeve telescopically positioned around said shaft and in frictional engagement therewith, a bearing means extending between said sleeve and inner walls of said column and comprising a rigid sleeve adjacent said resilient sleeve and having an upwardly and outwardly extending flange and a second sleeve rigidly secured to the inner walls of said column and having a downwardly and inwardly extending flange and a series of ball members positioned between said flanges, a hand wheel rigidly secured to the upper end of said shaft, and a compression means interposed between said hand wheel and said resilient sleeve constantly urging said sleeve downwardly along the axis of the shaft.

4. In a vehicle steering mechanism, a steering column, a steering shaft extending through said column, a hand wheel rigidly secured on the upper end of said shaft remote from said column, a resilient sleeve telescopically positioned around said shaft in direct frictional engagement therewith, an outwardly extending peripheral flange formed on the upper end of said sleeve, a bearing means positioned around said resilient sleeve and extending to the inner walls of said column and comprising a first rigid cylindrical sleeve positioned around said resilient sleeve and having an outwardly extending peripheral flange extending from said cylindrical sleeve and abutting the flange formed on said resilient sleeve and a second rigid sleeve rigidly secured to the inner walls of said column and having a downward and inwardly extending flange positioned below the flange of said first rigid sleeve and a series of ball members positioned between the flanges of said rigid sleeves, a compression means interposed between said hand wheel and said resilient sleeve constantly urging said resilient sleeve downwardly along the axis of said shaft and said first rigid sleeve into engagement with said ball members.

5. In a combination, a vehicle frame, a vehicle steering mechanism comprising a column, a shaft extending through said column, a resilient sleeve telescopically positioned around said shaft, a bearing means positioned around said sleeve having its inner race in engagement with the outer surface of said sleeve and its outer race in engagement with the inner walls of said column, a hand wheel secured to the upper end of said shaft, resilient compression means interposed between said wheel and said sleeve, a worm gear secured to the lower end of said shaft, and a housing carrying said worm gear and rigidly secured to said frame.

NILS ERIK WAHLBERG.

REFERENCES CITED

The following references are of record in the file of this patent:

UNITED STATES PATENTS

| Number | Name | Date |
|---|---|---|
| 918,600 | Schacht | Apr. 20, 1909 |
| 1,604,501 | Thomas | Oct. 26, 1926 |
| 1,822,855 | Blackmore | Sept. 8, 1931 |
| 1,998,735 | Rosmussen | Apr. 23, 1935 |
| 2,201,477 | Chamberlin | May 21, 1940 |